(12) United States Patent
Lorenz

(10) Patent No.: US 10,711,845 B2
(45) Date of Patent: Jul. 14, 2020

(54) CLUTCH DEVICE FOR A HYBRID DRIVE SYSTEM

(71) Applicant: SCHAEFFLER TECHNOLOGIES AG & CO. KG, Herzogenaurach (DE)

(72) Inventor: Elmar Lorenz, Rheinmuenster Soellingen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 222 days.

(21) Appl. No.: 15/749,686

(22) PCT Filed: Aug. 19, 2016

(86) PCT No.: PCT/DE2016/200388
§ 371 (c)(1),
(2) Date: Feb. 1, 2018

(87) PCT Pub. No.: WO2017/028864
PCT Pub. Date: Feb. 23, 2017

(65) Prior Publication Data
US 2018/0245640 A1 Aug. 30, 2018

(30) Foreign Application Priority Data
Aug. 20, 2015 (DE) .......................... 10 2015 215 897

(51) Int. Cl.
*F16D 13/52* (2006.01)
*F16F 15/14* (2006.01)
(Continued)

(52) U.S. Cl.
CPC .............. *F16D 21/06* (2013.01); *B60K 6/387* (2013.01); *F16D 13/46* (2013.01); *F16D 13/52* (2013.01);
(Continued)

(58) Field of Classification Search
CPC ......... B60K 6/387; F16D 13/46; F16D 13/52; F16D 25/0638; F16D 25/10;
(Continued)

(56) References Cited

U.S. PATENT DOCUMENTS 8,834,310 B2 * 9/2014 Goleski .............. F16H 63/3026
475/138
8,863,926 B2 * 10/2014 Knowles ................ B60K 6/387
192/48.611
(Continued)

FOREIGN PATENT DOCUMENTS

CN 102414040 A 4/2012
CN 102713327 A 10/2012
(Continued)

OTHER PUBLICATIONS

International Search Report for Application No. PCT/DE2016/200388, dated Dec. 5, 2016, 5 pages.
(Continued)

*Primary Examiner* — Ernesto A Suarez
*Assistant Examiner* — Lillian T Nguyen
(74) *Attorney, Agent, or Firm* — Brooks Kushman P.C.

(57) ABSTRACT

A clutch device, comprising a first and second input side and a first and second output side that can be rotated about a common axis. The clutch device further includes a first clutch located between the first input side and first output side, a second clutch located between the second input side and the second output side, and a centrifugal pendulum connected to the clutch device.

18 Claims, 5 Drawing Sheets

(51) Int. Cl.
  *F16D 21/06* (2006.01)
  *B60K 6/387* (2007.10)
  *F16D 13/46* (2006.01)
  *F16D 25/0638* (2006.01)
  *F16D 25/10* (2006.01)
(52) U.S. Cl.
  CPC ......... *F16D 25/0638* (2013.01); *F16D 25/10* (2013.01); *F16F 15/145* (2013.01); *B60Y 2200/92* (2013.01); *F16D 2021/0607* (2013.01); *F16D 2021/0661* (2013.01); *F16D 2021/0669* (2013.01); *F16D 2021/0692* (2013.01); *F16D 2300/22* (2013.01); *Y10S 903/914* (2013.01)
(58) Field of Classification Search
  CPC ..... F16D 2021/0607; F16D 2021/0692; F16D 2021/0669; F16D 2300/22; F16D 2021/0661; Y10S 903/914; F16F 15/145; B60Y 2200/92
  See application file for complete search history.

(56) References Cited

U.S. PATENT DOCUMENTS

| | | |
|---|---|---|
| 9,080,636 B2 | 7/2015 | Agner |
| 9,193,255 B2 | 11/2015 | Arnold et al. |
| 2004/0206599 A1* | 10/2004 | Hegerath ................ F16D 21/06 192/48.611 |
| 2005/0087420 A1* | 4/2005 | Schafer .................. F16D 21/06 192/55.61 |
| 2010/0326785 A1* | 12/2010 | Schrage .................. B60K 6/26 192/70.12 |
| 2011/0088989 A1* | 4/2011 | Agner ...................... F16D 3/12 192/48.601 |
| 2015/0024903 A1 | 1/2015 | Jeong et al. |
| 2017/0097051 A1* | 4/2017 | Baumann .............. F16D 13/385 |

FOREIGN PATENT DOCUMENTS

| | | | |
|---|---|---|---|
| CN | 103596789 A | 2/2014 | |
| CN | 104854361 A | 8/2015 | |
| DE | 102007003107 A1 | 8/2007 | |
| DE | 102009024217 A1 | 12/2009 | |
| DE | 102009059944 A1 | 7/2010 | |
| DE | 102013200408 A1 | 7/2013 | |
| DE | 102013213980 A1 * | 2/2014 | ............. F16D 21/06 |
| EP | 2287487 A1 | 2/2011 | |
| WO | 2014012543 A1 | 1/2014 | |

OTHER PUBLICATIONS

Chinese Office Action for Application No. 201680044524.8, dated Aug. 12, 2019, 7 pages.

* cited by examiner

CLUTCH DEVICE FOR A HYBRID DRIVE SYSTEM

CROSS-REFERENCE TO RELATED APPLICATIONS

This application is the U.S. National Phase of PCT/DE2016/200388 filed Aug. 19, 2016, which claims priority to DE 102015215897.7 filed Aug. 20, 2015, the entire disclosures of which are incorporated by reference herein.

TECHNICAL FIELD

The disclosure relates to a clutch device. In particular, the disclosure concerns a clutch device for a hybrid drive system.

BACKGROUND

A motor vehicle has a first drive motor which is configured as an electrical machine, and a second drive motor which is configured as an internal combustion engine. The motor vehicle drive may be hybrid, i.e. use any arbitrary combination of the first and/or second drive motors. For this, a clutch device is provided between the drive motors and a transmission of the motor vehicle.

DE 10 2009 059 944 A1 describes a clutch device for a motor vehicle with hybrid drive.

In order to avoid as far as possible propagating via the drive train torsional vibrations, which may be introduced into the drive train by the internal combustion engine, normally a spring damper is used. However, this has a limited range of use and may isolate fine vibrations poorly, in particular if the torque to be transmitted is high so that the spring of the spring damper is already heavily loaded, so that a return force is high.

SUMMARY

The disclosure is based on the object of indicating an improved clutch device, in particular for use in a hybrid drive. The disclosure achieves this object as set forth below.

A clutch device comprises a first input side and a second input side, a first output side and a second output side, wherein the input sides and the output sides can be rotated about a common rotation axis. The clutch device furthermore comprises a first clutch between the first input side and the first output side, and a second clutch between the first input side and the second output side. A third clutch is provided between the first input side and the second input side, and a centrifugal pendulum is provided.

The centrifugal pendulum may advantageously damp or reduce rotational irregularities in the region of the clutch device. Thus the clutch device may be better used, in particular in conjunction with an internal combustion engine, in a drive train of a motor vehicle. An installation space available, which may be limited in particular by the bell-like geometry of a gearbox to which the clutch device may be connected, can thus be better utilized.

The centrifugal pendulum may be connected to the input side. This may provide a more stable and compact structure of the clutch device. A flywheel mass or dual mass flywheel, which may be provided between one of the input sides and an internal combustion engine, may be supported in its effect by the clutch device.

The first and second clutches of the clutch device may be arranged offset to each other optionally axially, in another embodiment however also radially. The third clutch may lie axially offset to the other two clutches, but may also be arranged radially offset to at least one of them.

The centrifugal pendulum may be arranged axially outside the first and second clutches, and also the third clutch. In different embodiments, the centrifugal pendulum may be arranged on any axial side of the first and second clutches. In a first variant, the centrifugal pendulum lies on an axial side facing the second input side of the first, second and where applicable third clutch; in a second variant, it lies on the axial side facing away from the second input side. In a further embodiment, the first input side lies on the radial outside of the first and second clutches, so that the centrifugal pendulum can be better attached by force fit. The first input side may be constructed so as to be rotationally symmetrical. In particular, the first input side may be formed as a clutch cage for at least one of the clutches. The centrifugal pendulum may be integrated in the first input side or connected directly thereto.

The centrifugal pendulum may lie radially outside the first and second clutches. In this way, a pendulum mass of the centrifugal pendulum may be arranged on an effectively large radius relative to the rotation axis. The damping effect can thereby be improved. The pendulum mass may alternatively also be reduced in comparison with a pendulum flange with smaller radius, while retaining the same effect.

The first input side lies on the radial outside of the first and second clutches, and is supported relative to the rotation axis by using a radial element which simultaneously forms a pendulum flange of the centrifugal pendulum.

Also, two centrifugal pendulums may be provided which are arranged on different axial sides of the first and second clutches. The balancing effect of the centrifugal pendulum may thus be increased, and an existing installation space can be better utilized.

At least one of the clutches and the centrifugal pendulum may be in a common housing which is partially filled with a liquid medium. In particular, all three clutches together with the centrifugal pendulum may be arranged in the housing. Thus the clutches and the centrifugal pendulum may be configured so as to be better integrated with each other. The liquid medium, in particular an oil, may serve for cooling, cleaning and lubrication of clutch components and the centrifugal pendulum.

It is furthermore preferred that hydraulic actuator devices are provided for actuating the clutches. At least one of the clutches may be actuated hydraulically. The first and second clutches may be actuated by the same principle, in particular both hydraulically. The third clutch may also be actuated hydraulically. An actuating fluid of a hydraulic actuator device may comprise the liquid medium with which the housing is at least partially filled.

The first input side may be configured for connection to a rotor of an electrical machine. In particular, the rotor may be radially outwardly surrounded by a stator of the electrical machine. This allows a compact drive unit which integrates both the clutch device and the electrical machine.

Also, the second input side may be configured for connection to an output shaft of a combustion machine, in particular an internal combustion engine, for example using the reciprocating piston principle. In this way, the clutch device may be used particularly well for a hybrid drive such as in a motor vehicle.

BRIEF DESCRIPTION OF THE DRAWINGS

The disclosure is now explained in more detail below with reference to the attached figures, in which.

DETAILED DESCRIPTION

Figure 1:
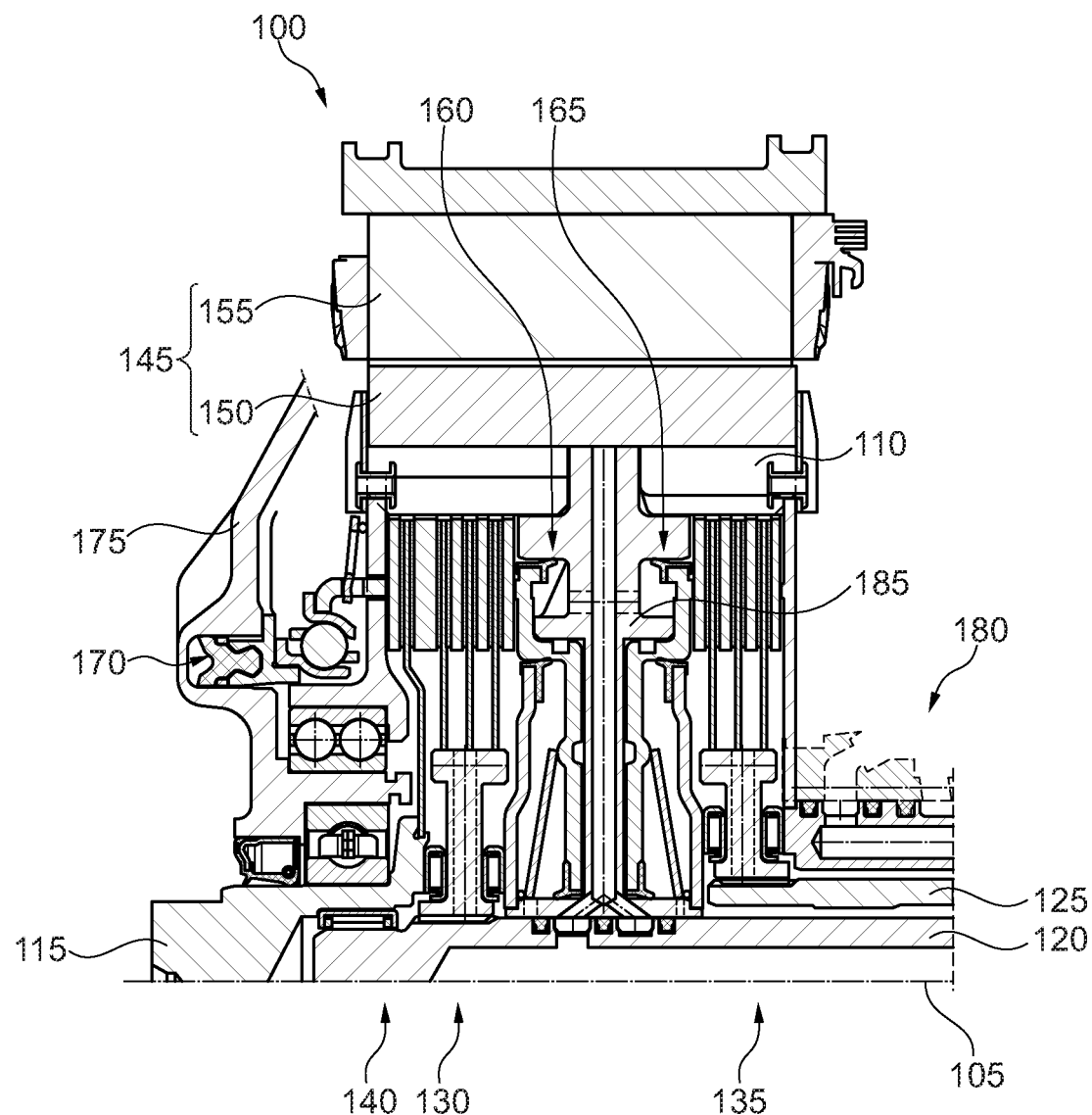
FIG. 1 shows an exemplary clutch device.

FIG. 1 shows an exemplary clutch device 100. A first input side 110, a second input side 115, a first output side 120 and a second output side 125 are arranged around a rotation axis 105.

A first clutch 130 lies between the first input side 110 and the first output side 120, a second clutch 135 lies between the first input side 110 and the second output side 125, and an optional third clutch 140 lies between the first input side 110 and the second input side 115. The first two clutches 130 and 135 are offset radially or preferably axially to each other and form an axial double clutch. The third clutch 140 is preferably offset axially to at least one of the two other clutches 130 and 135.

The first input side 110 is configured for connection to an electrical machine 145 which in general comprises a rotor 150 and a stator 155. Preferably, the electrical machine 145 is of the internal rotor type, wherein the rotor 150 lies radially inside the stator 155. It is further preferred that the stator 155 comprises at least one magnetic coil, and the rotor 150 comprises at least one permanent magnet. The rotor 150 preferably lies radially outside the clutches 130, 135 and 140, and in the embodiment shown is connected to the first input side 110 by using riveting. The second input side 115 may be configured for connection to a combustion machine, in particular an internal combustion engine, further preferably a reciprocating piston engine.

The output sides 120 and 125 are configured for connection to input shafts of a double gearbox (not shown). The double gearbox is normally configured to couple each of the input shafts to a common output shaft by a separate gearwheel pair. If the drive train is arranged in a motor vehicle, the output shaft may finally act on a drive wheel of the motor vehicle. In order to select a gear, usually one of the clutches 130, 135 is closed while the respective other clutch 130, 135 is opened. Preferably, the double gearbox comprises several gearwheel pairs on each gearbox shaft, each pair forming a gear stage. A gearwheel pair may usually be engaged or disengaged when it is connected to an output shaft 120, 125, the assigned clutch 130, 135 of which is already opened.

The clutch device 100 in particular is configured to be used in the drive train of a motor vehicle. The motor vehicle may preferably have hybrid drive, i.e. be driven either by the internal combustion engine, or by the electrical machine 145, or alternatively by both drive motors. If the internal combustion engine is used, the third clutch 140 is closed. If the electrical machine 145 is used, it is normally actuated electrically such that torque can be transferred. The two drive motors may apply both positive and negative torque to the drive train. The electrical machine 145 may also receive kinetic energy from the drive train and convert this into electrical energy, which for example may be temporarily stored in an energy accumulator. Because of its compact structure, the clutch device 100 is particularly suitable for installation transversely at the front of the motor vehicle.

A first actuator device 160 is assigned to the first clutch 130, a second actuator device 165 to the second clutch 135, and a third actuator device 170 to the third clutch 140. Preferably, all three actuator devices 160, 165 and 170 are hydraulic and are each configured to exert an axial force on one of the clutches 130, 135, 140, so that friction elements of the clutches 130, 135 or 140 are pressed axially against each other in order to generate a friction engagement and transmit a torque between the friction elements. The friction elements may each be pressed together between the assigned actuator device 160, 165, 170 and an axial thrust bearing. Furthermore, the hydraulic actuator devices 160, 165, 170 can be actively controlled individually in that, by use of e.g. a valve or pump, pressurized pressure medium is deliberately introduced into or discharged from a hydraulic pressure chamber of the respective actuator device 160, 165, 170. Alternatively for example, a centrifugal oil-controlled actuation may be provided.

The three clutches 130, 135 and 140 may be arranged in a common housing 175 which may be at least partially filled with a liquid medium 180, in particular an oil. The medium 180 may also be used as a working medium (hydraulic fluid) for one of the actuator devices 160, 165 and 170. The clutches 130, 135 and 140 may be each of the wet-running type and may be designed independently of each other as single plate or multiplate clutches. Furthermore, the first clutch 130 and the second clutch 135 may be of the multiplate type, in order to allow finely-controlled opening and closing of the torque flow through the clutches 130, 135. The third clutch 140 may also, as shown, be of the single plate type, wherein the third clutch 140 may be configured as a shift clutch which as far as possible is not operated under slip.

In the embodiment shown, a radial flange 185 is arranged axially between the first clutch 130 and the second clutch 135 as a thrust bearing, against which the clutches 130, 135 may be pressed by using the assigned actuator device 160, 165. Axial forces of the actuator devices 160, 165, 170 are preferably supported inside the clutch device 100, so that no resulting forces need be supported externally.

If the clutch device 100 is used in a drive train without the electrical machine 145, the third clutch 140 may also be omitted. The first input side 110 and the second input side 115 then coincide.

It is proposed to attach a centrifugal pendulum to the clutch device 100 in order to reduce irregularities of a rotational motion which may be transmitted by the clutch device 100. These irregularities may in particular comprise a rotational vibration, which may be induced for example by a reciprocating piston internal combustion engine which is connected to the second input side 115.

Figure 2:
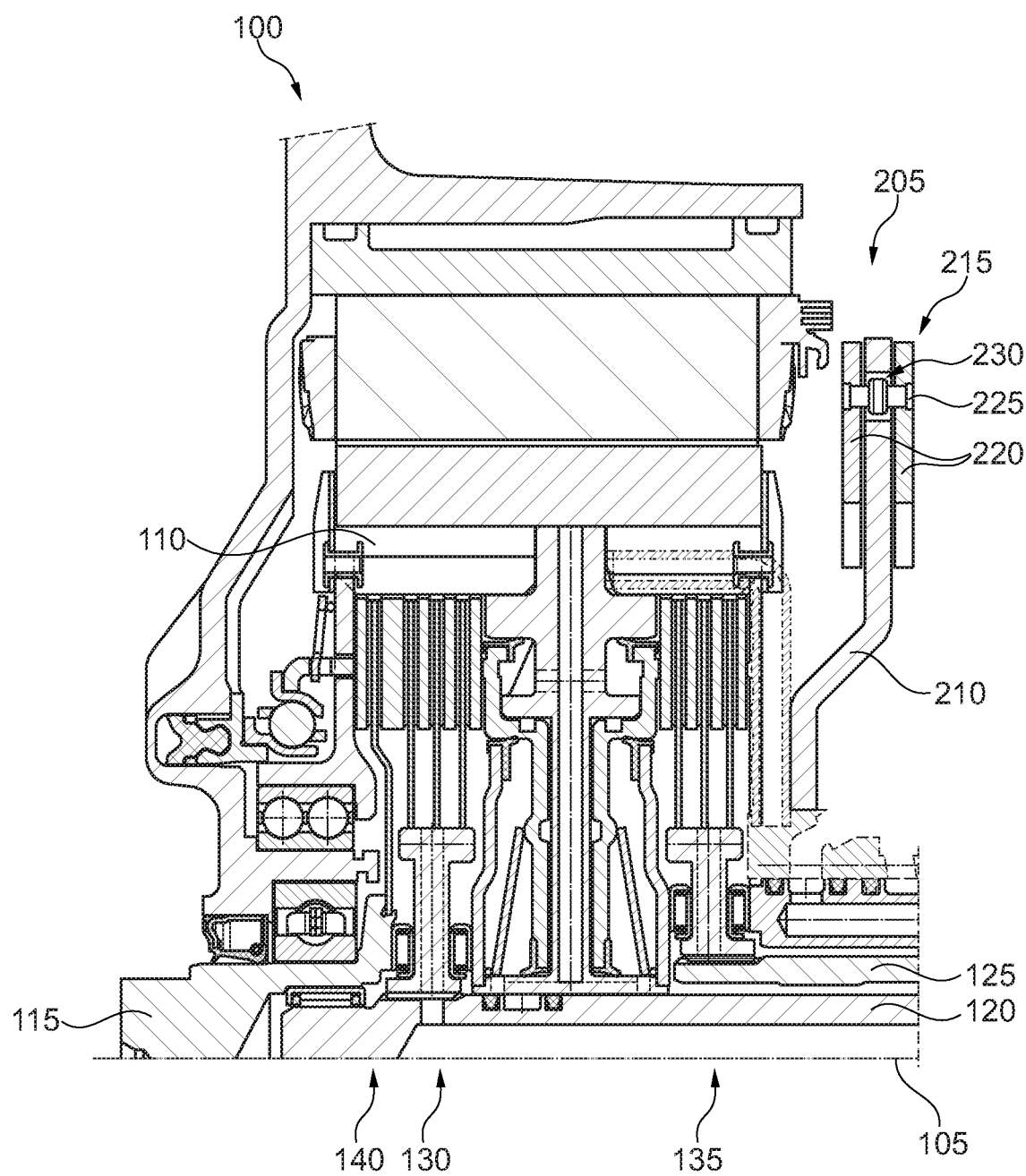
FIG. 2 shows a clutch device according to FIG. 1 with a flanged centrifugal pendulum.

FIG. 2 shows a clutch device 100 according to FIG. 1 with a flanged centrifugal pendulum 205. Here, as in the other figures, an axial arrangement of the first clutch 130 and second clutch 135 is assumed; a different arrangement, in particular a radially offset arrangement, is also possible. The third clutch 140 is for example arranged axially offset to the other two clutches 130, 135.

The second input side 115 may lie axially opposite the output sides 120, 125 relative to the clutches 130, 135. A centrifugal pendulum 205 is attached to the first input side 110. Here, the centrifugal pendulum preferably lies axially offset to the clutches 130, 135 and where applicable also 140.

The centrifugal pendulum 205 comprises a pendulum flange which is attached rotationally stably around the rotation axis 105 on the first input side 110, and a pendulum mass 215 which is movable along a predefined pendulum track that extends in the rotational plane about the rotation axis 105. The centrifugal pendulum 205 depicted is of the external type, wherein the pendulum mass 215 comprises two pendulum elements 220 which lie opposite each other on different axial sides of the pendulum flange 210. The pendulum elements 220 may be attached to each other by using a bolt 225, wherein the bolt 225 extends axially through a groove 230 made in the pendulum flange 210. Thus the pendulum mass 215 is held movably on the pendulum flange 210 in the manner of a sliding block guide.

In an alternative internal embodiment, two axially offset pendulum flanges 210 are provided, between which a pendulum element 220 is arranged movably. Here again, a fixing in the manner of a sliding block guide may be used, in which the bolt 225 extends preferably through the single pendulum element 220 and through two mutually corresponding grooves 230 in the two pendulum flanges 210. Combinations of the internal and external type of centrifugal pendulum 210 may also be used on the clutch device 100.

The clutch device 100 may be configured such that it has approximately the same damping as a dual mass flywheel, which may be arranged in particular between the second input side 115 and an internal combustion engine.

In the embodiment depicted, the centrifugal pendulum 205 is arranged on the side lying axially opposite the second input side 115 relative to the clutches 130, 135 and where applicable 140; alternatively, the centrifugal pendulum 205 and the input side 115 may however lie on the same axial side. It is further preferred that the centrifugal pendulum 205, and more precisely the pendulum mass 215, lies radially outside the clutches 130, 135 and where applicable 140. Embodiments lying further inward are however also possible.

The centrifugal pendulum 205 depicted is flanged axially to the arrangement of clutches 130, 135 and where applicable 140, so it can be dismounted therefrom. A force-fit connection between the centrifugal pendulum 205 and the first input side 110 may be created by a interference fit. The force flow, as depicted in FIG. 2, may here run initially radially inwardly from the pendulum flange 210 up to the region of a radial bearing point of the first input side 110, and from there again radially outwardly. Alternatively, a more direct connection may be provided at a predefined radial distance from the bearing point.

Figure 3:
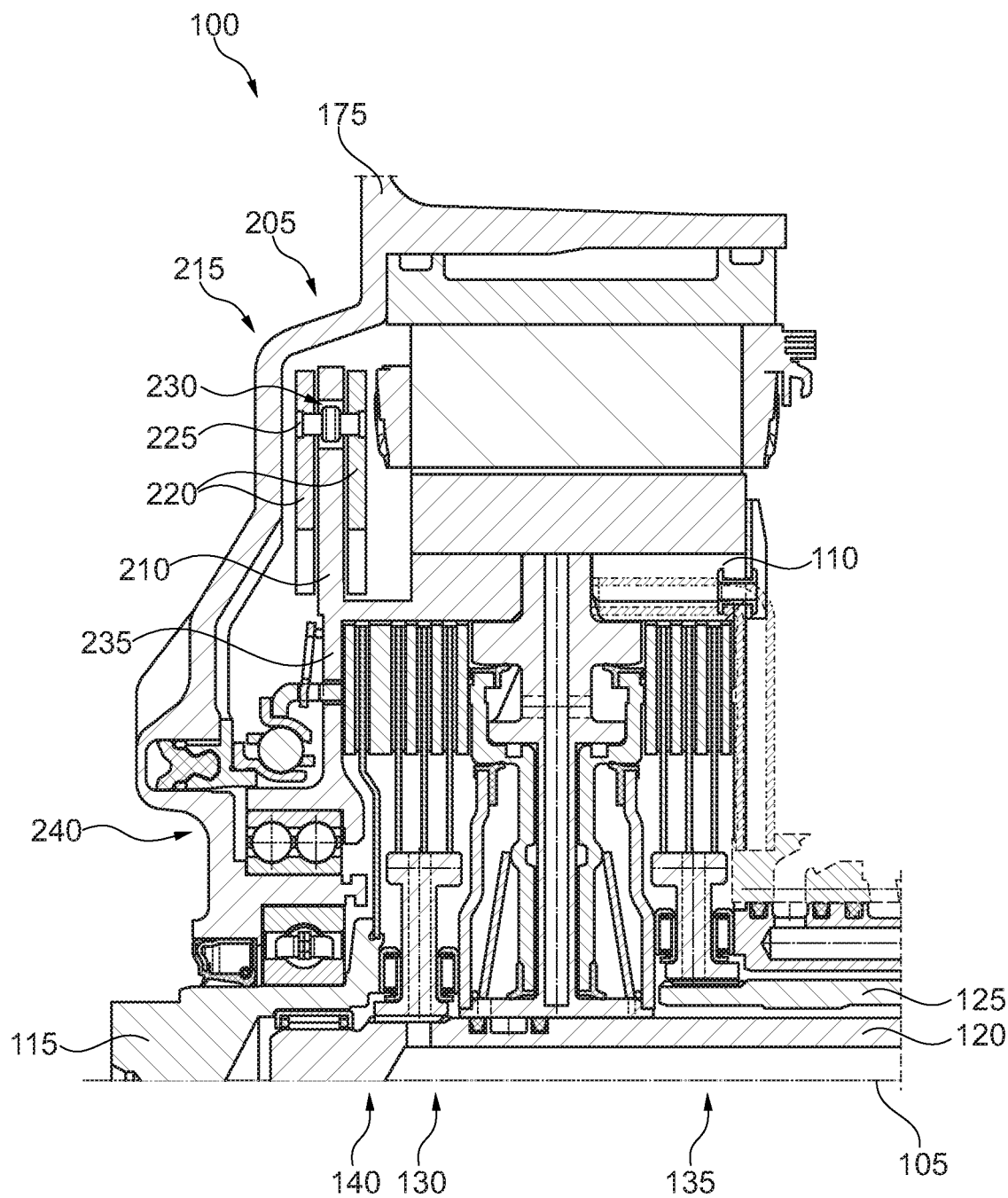
FIG. 3 shows a clutch device according to FIG. 1 with an integrated centrifugal pendulum.

FIG. 3 shows a clutch device 100 according to FIG. 1 with an integrated centrifugal pendulum 205. In contrast to the embodiment depicted in FIG. 2, here the centrifugal pendulum 205 lies axially on the same side as the second input side 115, and thus axially opposite the output sides 120, 125 of the clutches 130, 135 and where applicable 140. The centrifugal pendulum 2015 may again be axially offset to the clutches 120 and 125, although here it is axially offset from but not free from overlap with the third clutch 140.

On the left in the depiction of FIG. 2, the first input side 110 is mounted radially relative to the housing 175 by using a radial web 235 and a bearing 240, although other bearings are possible. The bearing 240 is formed for example as a double-row ball bearing. The web 235 is extended radially outwardly beyond the input side 110 and transforms into the pendulum flange 210. A one-piece design is preferred but not absolutely necessary. The web 235 and the pendulum flange 210 may align, so that the radial forces can be better transmitted. Further, the bearing 240 may be axially aligned as far as possible with the web 235, in order to be able to transfer the radial forces directly on a short path.

Figure 4:
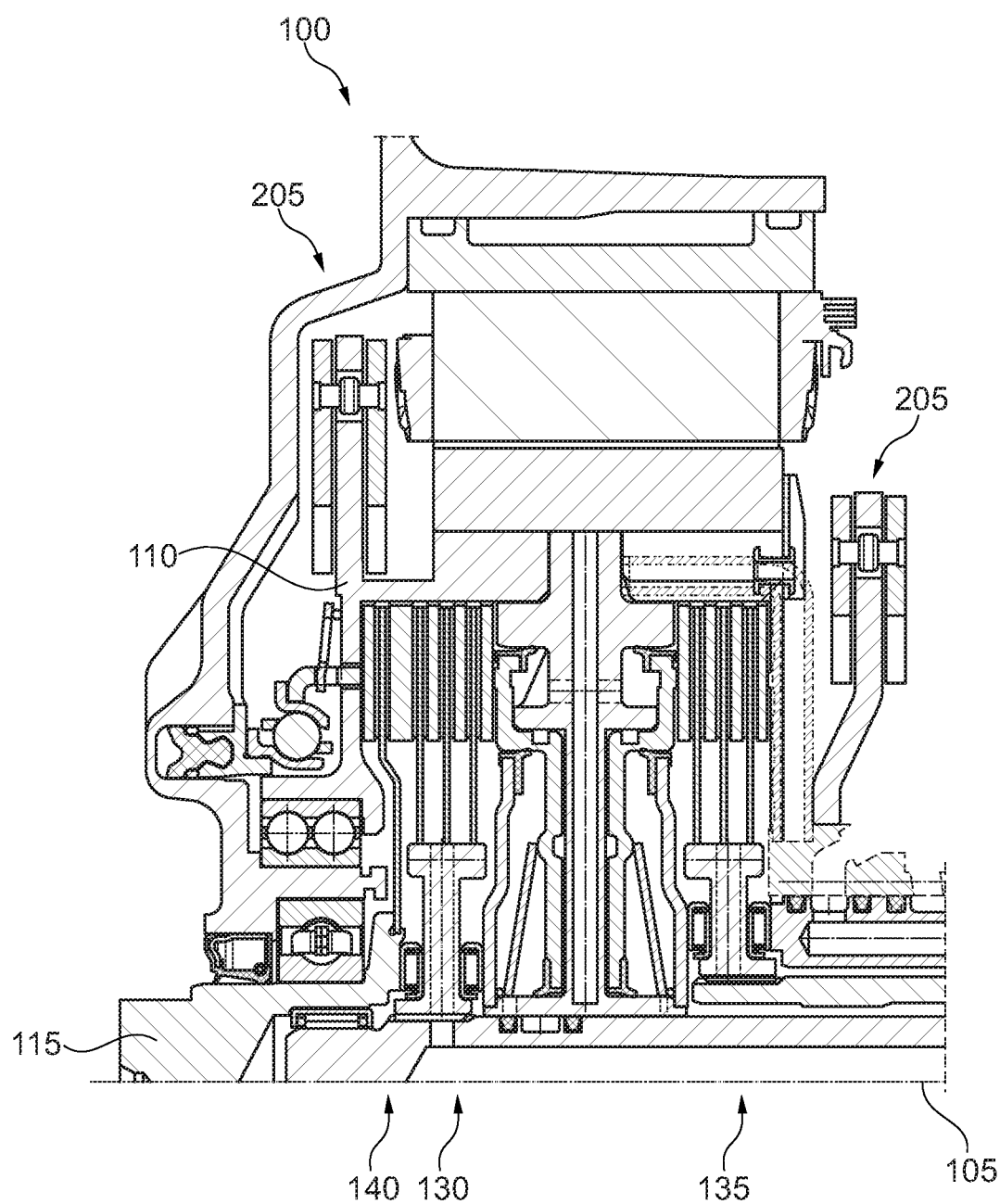
FIG. 4 shows a clutch device according to FIG. 1 with an integrated and a flanged centrifugal pendulum.

FIG. 4 shows a clutch device 100 according to FIG. 1 with an integrated centrifugal pendulum 205 according to the embodiment of FIG. 2, and a flanged centrifugal pendulum 205 according to the embodiment of FIG. 3. The centrifugal pendulums may lie axially opposite each other relative to the clutches 130, 135 and where applicable also 140. Two flanged centrifugal pendulums 205 (see FIG. 2) or two integrated centrifugal pendulums 205 (see FIG. 3) may also be used.

Figure 5:
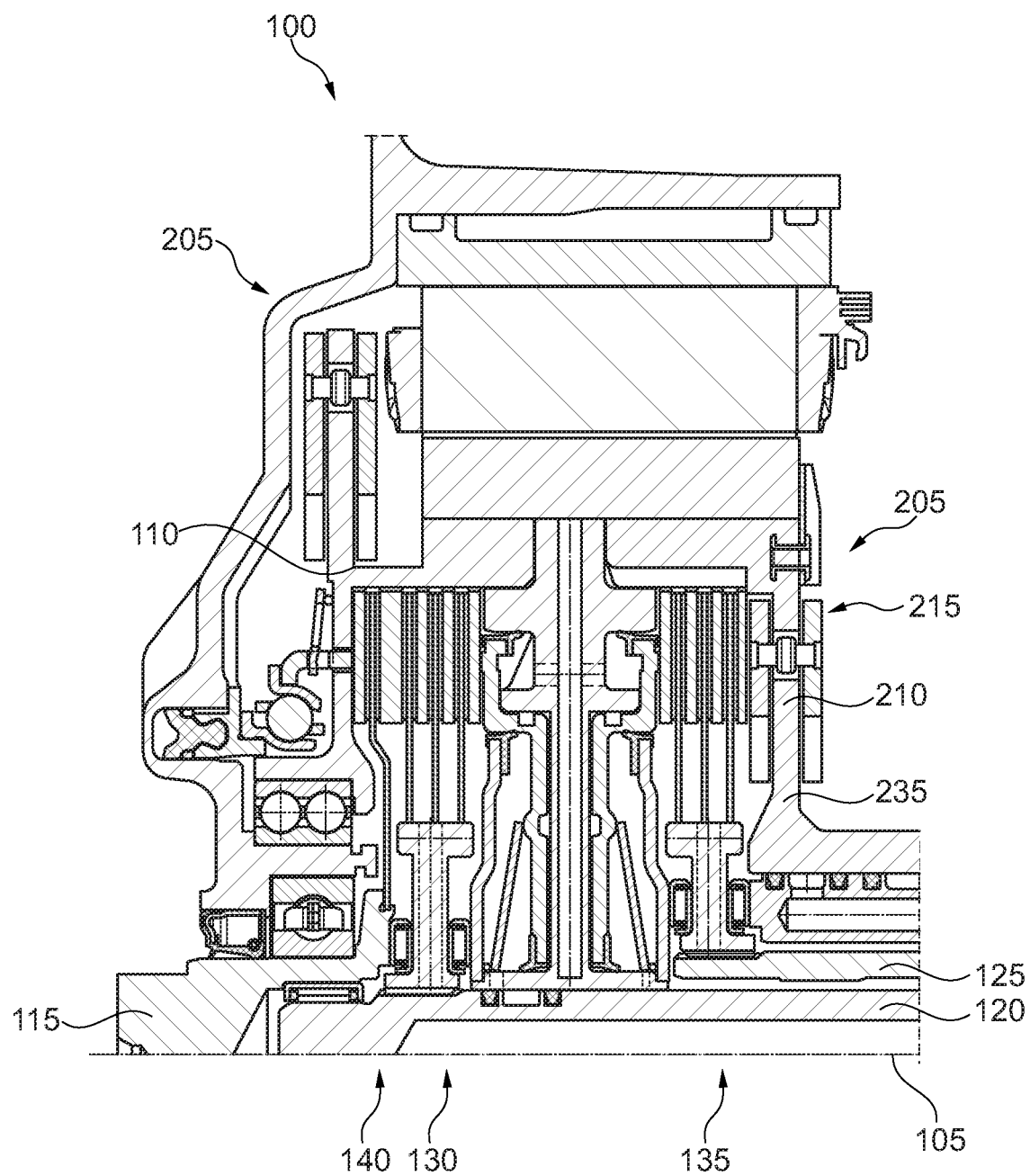
FIG. 5 shows a clutch device according to FIG. 1 with two centrifugal pendulums according to a further embodiment.

FIG. 5 shows a clutch device 100 according to FIG. 1 with two centrifugal pendulums 205 according to a further embodiment. Here, on the right side in the depiction in FIG. 5, the first input side 110 has a radial web 235 which radially supports the first input side 110. A first centrifugal pendulum 205 is arranged here; preferably, a further one, which is here configured as in the embodiments of FIG. 3 or 4, is arranged on the left side. The right centrifugal pendulum 205 may be integrated with the radial web 235, in that the web 235 simultaneously serves as a pendulum flange 210 on which the pendulum mass 215 is attached. On the right side, radially inwardly, the web 235 may be supported relative to a decoupling device 505 which decouples a conduction of hydraulic fluid to a hydraulic actuator device 160, 165, 170 from the rotational movement of the first input side 110.

With different compositions of components or features described above with reference to FIGS. 1 to 5, the clutch device 100 can be adapted variably to a predefined application. In particular, it may be simple to provide the clutch device 100 in corresponding variants with and without a third clutch 140. Thus the clutch device 100 may be used in particular on a small or medium-sized motor vehicle with or without electrical machine 145, i.e. with hybrid drive or conventional drive. In both variants, a compact structure of the clutch device 100 can be achieved. The torque transmission, free from tensile forces, on selection of a gear can be utilized by the design of the clutch device 100 as a double clutch in conjunction with a double gearbox.

LIST OF REFERENCE DESIGNATIONS

100 Clutch device
105 Rotation axis
110 First input side
115 Second input side
120 First output side
125 Second output side
130 First clutch
135 Second clutch
140 Third clutch
145 Electrical machine
150 Rotor
155 Stator
160 First actuator device
165 Second actuator device
170 Third actuator device
175 Housing
180 Liquid medium
185 Flange
205 Centrifugal pendulum
210 Pendulum flange
215 Pendulum mass
220 Pendulum element
225 Bolt
230 Groove
235 Web
240 Bearing
505 Decoupling device

The invention claimed is:

1. A clutch device, comprising:
a first and a second input side;
a first and a second output side;
wherein the first and second input sides and the first and second output sides can be rotated about a common rotation axis;
a first clutch between the first input side and the first output side; a second clutch between the first input side and the second output side;
a third clutch between the first input side and the second input side; and
a centrifugal pendulum;
wherein the centrifugal pendulum is directly connected to the first input side.

2. The clutch device of claim 1, wherein the first and second clutches are axially offset.

3. The clutch device of claim 1, wherein the centrifugal pendulum is arranged axially outside the first and second clutches.

4. The clutch device of claim 1, wherein the centrifugal pendulum is arranged radially outside the first and second clutches.

5. The clutch device of claim 4, wherein the first input side lies on a radial outside of the first and second clutches, and is supported relative to the rotation axis by using a radial element which forms a pendulum flange of the centrifugal pendulum.

6. The clutch device of claim 1, wherein two centrifugal pendulums are provided that are arranged on different axial sides of the first and second clutches.

7. The clutch device of claim 1, wherein at least one of the first, second, or third clutches and the centrifugal pendulum are arranged in a common housing that is partially filled with a liquid medium.

8. The clutch device of claim 1, wherein the first input side is configured for connection to a rotor of an electrical machine.

9. The clutch device of claim 8, wherein the rotor is surrounded radially outwardly by a stator of the electrical machine.

10. The clutch device of claim 1, wherein the second input side is configured for connection to an output shaft of an internal combustion engine.

11. A clutch device, comprising:
a first and second input side and a first and second output side that can be rotated about a common axis;
a first clutch located between the first input side and first output side;
a second clutch located between the second input side and the second output side; and
a centrifugal pendulum connected to the clutch device, wherein the clutch device includes a third clutch located between the first input side and the second input side;
wherein the centrifugal pendulum is directly connected to the first input side.

12. The clutch device of claim 11, wherein a flywheel is located between either the first or second input side and an internal combustion engine.

13. The clutch device of claim 11, wherein the first clutch and the second clutch are radially offset from one another.

14. A clutch device, comprising:
a first and second input side and a first and second output side that can be rotated about a common axis;
a first clutch located between the first input side and first output side;
a second clutch located between the second input side and the second output side;
a third clutch located between the first input side and the second input side; and
a centrifugal pendulum is directly connected to the second input side.

15. The clutch device of claim 14, wherein the centrifugal pendulum is arranged axially outside the first and second clutches with respect to the common axis.

16. The clutch device of claim 15, wherein the centrifugal pendulum is arranged axially outside the third clutch.

17. The clutch device of claim 14, wherein the centrifugal pendulum is arranged radially outside the first and second clutches with respect to the common axis.

18. The clutch device of claim 14, wherein the centrifugal pendulum and the first, second, and third clutch are arranged in a common housing.

* * * * *